US012560709B2

(12) United States Patent
Brown

(10) Patent No.: US 12,560,709 B2
(45) Date of Patent: Feb. 24, 2026

(54) ULTRASONIC SYSTEM AND METHOD FOR DETERMINING THE LOCATION OF A DRIVER OF A VEHICLE

(71) Applicant: AUMOVIO Autonomous Mobility Germany GmbH, Ingolstadt (DE)

(72) Inventor: Christopher Brown, Seligenstadt (DE)

(73) Assignee: AUMOVIO Autonomous Mobility Germany GmbH, Ingolstadt (DE)

( * ) Notice: Subject to any disclaimer, the term of this patent is extended or adjusted under 35 U.S.C. 154(b) by 415 days.

(21) Appl. No.: 17/310,402

(22) PCT Filed: Dec. 11, 2019

(86) PCT No.: PCT/DE2019/200144
§ 371 (c)(1),
(2) Date: Jul. 30, 2021

(87) PCT Pub. No.: WO2020/156605
PCT Pub. Date: Aug. 6, 2020

(65) Prior Publication Data
US 2022/0099829 A1     Mar. 31, 2022

(30) Foreign Application Priority Data

Jan. 30, 2019    (DE) .......................... 102019201186.1

(51) Int. Cl.
*G01S 15/12*       (2006.01)
*B60W 30/06*      (2006.01)
(Continued)

(52) U.S. Cl.
CPC ............. *G01S 15/12* (2013.01); *B60W 30/06* (2013.01); *G01S 5/0072* (2013.01); *G01S 5/22* (2013.01);
(Continued)

(58) Field of Classification Search
CPC .......... G01S 15/12; G01S 5/0072; G01S 5/22; G01S 7/527; G01S 15/876; G01S 15/931; G01S 2015/932; G01S 5/20; B60W 30/06
See application file for complete search history.

(56) References Cited

U.S. PATENT DOCUMENTS

| | | | | |
|---|---|---|---|---|
| 11,148,661 B2 * | 10/2021 | Golgiri | ................. | B60W 30/06 |
| 2009/0180352 A1 * | 7/2009 | Reiche | .................... | G01S 7/523 |
| | | | | 370/276 |

(Continued)

FOREIGN PATENT DOCUMENTS

| | | | | |
|---|---|---|---|---|
| EP | 2821807 A2 | 1/2015 | | |
| EP | 3385745 A1 * | 10/2018 | ............... | G01S 3/02 |

OTHER PUBLICATIONS

PCT International Search Report and Written Opinion of the International Searching Authority, dated Apr. 15, 2020, for corresponding PCT patent application PCT/DE2019/200144.

(Continued)

*Primary Examiner* — Abdallah Abulaban
(74) *Attorney, Agent, or Firm* — Buchanan Ingersoll & Rooney PC

(57) ABSTRACT

An ultrasonic system for determining the location of a driver of a vehicle, includes a hand-held device with at least a first ultrasonic sensor, wherein the first ultrasonic sensor has at least one transmitter, and a motor vehicle having a multiplicity of second ultrasonic sensors, wherein the second ultrasonic sensors each have at least one receiver for receiving signals of the first ultrasonic sensor. A method is disclosed for determining the location of a driver of a vehicle.

19 Claims, 1 Drawing Sheet

(51) Int. Cl.

| | |
|---|---|
| *G01S 5/00* | (2006.01) |
| *G01S 5/22* | (2006.01) |
| *G01S 7/527* | (2006.01) |
| *G01S 15/87* | (2006.01) |
| *G01S 15/931* | (2020.01) |

(52) U.S. Cl.
CPC ............ *G01S 7/527* (2013.01); *G01S 15/876* (2013.01); *G01S 15/931* (2013.01); *G01S 2015/932* (2013.01)

(56) References Cited

U.S. PATENT DOCUMENTS

| | | | |
|---|---|---|---|
| 2011/0025494 A1* | 2/2011 | Adcook ................. | G01S 15/10 |
| | | | 340/539.13 |
| 2017/0019525 A1* | 1/2017 | Hannon ................. | G01S 1/752 |
| 2017/0225679 A1* | 8/2017 | Bonnet ............. | B62D 15/0285 |
| 2017/0361806 A1 | 12/2017 | Scheim et al. | |
| 2018/0357842 A1* | 12/2018 | Ulsamer ................ | G06T 19/00 |
| 2019/0111916 A1* | 4/2019 | Lee ........................ | G08G 1/143 |

OTHER PUBLICATIONS

DIAMLER—Remote Parking Pilot: Remote parking with the smart-phone app, Global Media Site, https://group-media.mercedes-benz.com/marsMediaSite/en/instance/ko/Remote-Parking-Pilot-Remote-parking-with-the-smartphone-app.xhtml?oid=9361355, Jul. 13, 2015.
Examination Report dated Dec. 16, 2024 for the counterpart European Patent Application No. 19 848 770.4 and machine translation of same.

\* cited by examiner

10

12

14

18

16

20

22

22

22

22

S1

S2

S3

ULTRASONIC SYSTEM AND METHOD FOR DETERMINING THE LOCATION OF A DRIVER OF A VEHICLE

CROSS REFERENCE TO RELATED APPLICATIONS

This application is a National Stage Application under 35 U.S.C. 371 of International Application No. PCT/DE2019/200144 filed on Dec. 11, 2019, which claims priority from DE 10 2019 201 186.1, filed on Jan. 30, 2019, the disclosures of which are herein incorporated by reference in their entireties.

FIELD OF INVENTION

The invention relates to an ultrasonic system for determining the location of a driver of a vehicle and a method for determining the location of a driver of a vehicle.

BACKGROUND

Nowadays, it is difficult to imagine motor vehicles without driver assistance systems. Driver assistance systems have functions which support the driver of the vehicle both while driving and while parking. Parking represents the greatest challenge for most vehicle users. Once a parking space has finally been found, this is frequently so tight that it is just about possible to pull into the space—whether the driver parks the car himself or is supported by the parking assistant—but it is no longer possible to get out of the vehicle without a series of contortions. Remote parking assistants address precisely this issue. If the parking assistant recognizes a suitable parallel, perpendicular or oblique parking space or a garage entrance, the driver immediately receives feedback. The driver then gets out of the vehicle ahead of the selected parking space and starts the parking maneuver by remote control, by way of example via a button on his car key or on his smartphone. The vehicle pulls into the parking space independently and, if necessary, pulls out again, without anybody sitting at the steering wheel. The important thing during such a parking operation is that the location of the driver can be determined throughout. This ensures that the car does not drive over the driver and also that the driver is close enough to the car in order to be able to observe the operation and guarantee his safety.

In order to determine the location of the driver of the vehicle, the use of high-frequency signals such as, for example, Bluetooth or Wi-Fi, is known. The disadvantage of this is that determining the location of a HF source by means of signal strength has restricted accuracy and requires multiple receivers in the entire vehicle. The use of directional receivers is complicated and requires special hardware with the accompanying parts list and integration costs.

The process of detecting the driver by means of optical devices such as, for example, cameras is further known. In order to identify and track the driver, passenger recognition technology is in particular used. The disadvantage of this is that these fail as soon as the driver is concealed, for example by other persons or any other obstacles, or if the light conditions are unfavorable such as, for example, insufficient illumination or a very low position of the sun. Added to this there is the difficulty of identifying and tracking the driver when he leaves the vehicle.

SUMMARY

Starting from this, it is now an object to provide a system or a method with which a reliable, robust and inexpensive determination of the location of a driver of a vehicle can be guaranteed.

According to a first aspect, the present disclosure relates to an ultrasonic system for determining the location of a driver of a vehicle, having a hand-held device with at least a first ultrasonic sensor, wherein the first ultrasonic sensor has at least one transmitter, and a motor vehicle having a multiplicity of second ultrasonic sensors, wherein the second ultrasonic sensors each has at least one receiver for receiving signals of the first ultrasonic sensor.

The ultrasonic system according to the disclosure in particular ensures an improved determination of the location of a driver of a vehicle, without requiring expensive hardware. In particular, high accuracy and robustness can be attained.

Within the meaning of the disclosure, a hand-held device is in particular to be understood to be a mobile device which, due to its size and/or its weight, can be carried without great physical exertion and can therefore be deployed in a mobile manner. The hand-held device is preferably a car key, a key fob, a smartphone and/or a tablet.

In a configuration, the first ultrasonic sensor is configured in such a manner that it does not transmit ultrasonic signals until the operation for pulling into and/or out of a parking space is activated. The signal is then transmitted in particular during the operation for pulling into and/or out of a parking space. At the end of the operation, the transmitting of the signal also ends. Further, it is also conceivable that the transmitting of ultrasonic signals can be started in response to a manual command. To this end, the ultrasonic sensor can have an activation unit and/or can be connected to an activation unit. The transmitting of the signal can in particular start when the driver of the vehicle actuates the activation unit. The transmitting of the signal is in particular terminated by the driver of the vehicle actuating the activation unit again or letting go of the latter. It is also possible that the transmitting of the signal is terminated when the activation unit has recognized the end of a parking operation.

In a configuration, the first ultrasonic sensor is configured as a sender or transmitter. In particular, the first ultrasonic sensor is exclusively configured as a sender, that is to say it exclusively has a transmitter and no receiver. Therefore, it does not have any receiver characteristics at all.

The first ultrasonic sensor is advantageously configured in such a manner that it transmits a series of ultrasonic bursts after a unique and/or identifiable code. Within the meaning of the present disclosure, a burst is in particular understood to be a limited number of oscillations of a fixed frequency. The ultrasonic sensor preferably transmits an ultrasonic burst after a known code, in particular after a known time code. A signal thus has a specific, fixed duration. However, it is also conceivable that a frequency code is transmitted.

A time interval between the individual bursts does not have to be specified. The time interval can, however, also follow a fixed pattern. This can appear to be random, wherein it is however specified and/or is known to the second ultrasonic sensors and it is in particular also recognized by these as such. The ultrasonic signal is transmitted as a stochastic code.

In a configuration, the second ultrasonic sensors are configured in such a manner that they receive signals of the first ultrasonic sensor when an operation for pulling into and/or out of a parking space is activated. In particular, they receive the signals exclusively during a parking operation.

The ultrasonic system has at least three second ultrasonic sensors. These are in particular arranged on the vehicle in such a manner that they can receive the signals of the first ultrasonic sensor. It is advantageous if at least three second sensors are arranged on the vehicle in such a manner that they can all receive an ultrasonic signal transmitted by the first ultrasonic sensor.

According to a second aspect, the present disclosure relates to a method for determining the location of a driver of a vehicle, having the following steps:

transmitting of ultrasonic signals by at least a first ultrasonic sensor which is arranged on a hand-held device, receiving of the ultrasonic signals by a multiplicity of second ultrasonic sensors arranged on a vehicle, processing of the received ultrasonic signals, as a result of which the position of the hand-held device with respect to the vehicle can be determined.

A distance is calculated between the hand-held device and the vehicle.

In an advantageous configuration, the first ultrasonic sensor only transmits ultrasonic signals, wherein it cannot receive any ultrasonic signals.

The first ultrasonic sensor can transmit a series of ultrasonic bursts after a known time code. The time code can firstly appear to be random, wherein it is however specified and/or is known to the second ultrasonic sensors and is in particular also identified by the latter as such.

It is advantageous if the determination of the location of the driver of the vehicle takes place during an operation for pulling into and/or out of a parking space, in particular exclusively during an operation for pulling into and/or out of a parking space.

In a configuration, an operation for pulling into and/or out of a parking space is recognized or activated. In particular, the ultrasonic signals are transmitted by the first ultrasonic sensor and/or the ultrasonic signals are received by the second ultrasonic sensors and/or processed only after the operation for pulling into and/or out of a parking space has been recognized and/or activated.

It is advantageous if the operation for pulling into and/or out of a parking space is interrupted as soon as it is established that a specific distance between the hand-held device and the vehicle has been exceeded.

BRIEF DESCRIPTION OF THE DRAWINGS

Further advantageous configurations are set out in the drawings, wherein.

DETAILED DESCRIPTION

Figure 1:
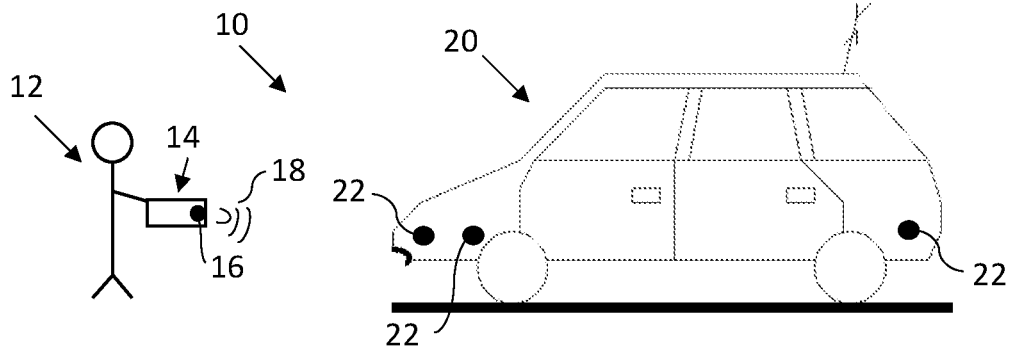
FIG. 1: shows a schematic representation of an ultrasonic system according to the invention in a configuration.

FIG. 1 shows a schematic representation of an ultrasonic system 10 according to the present disclosure for determining the location of a driver of a vehicle 12 in a configuration. The ultrasonic system 10 includes a hand-held device 14 with at least a first ultrasonic sensor 16, wherein the first ultrasonic sensor 16 has at least one transmitter. The hand-held device 14 can be a key fob, a smartphone and/or a tablet. It is advantageous if the first ultrasonic sensor 16 is exclusively configured as a sender/transmitter and can consequently only transmit ultrasonic signals, but cannot receive them. The first ultrasonic sensor 16 is configured in such a manner that it transmits a series of ultrasonic bursts after a known time code.

The ultrasonic system 10 further includes a motor vehicle 20 having a multiplicity of second ultrasonic sensors 22, wherein the second ultrasonic sensors 22 each has at least one receiver for receiving signals of the first ultrasonic sensor 16. The second ultrasonic sensors 22 are in particular configured in such a manner that they exclusively receive signals 18 of the first ultrasonic sensor 16 during an operation for pulling into and/or out of a parking space. If the sensors 22 have multiple receiver channels, in particular two receiver channels, then one channel can listen to the sensor 16 and the other channel can listen for other signals.

Figure 2:
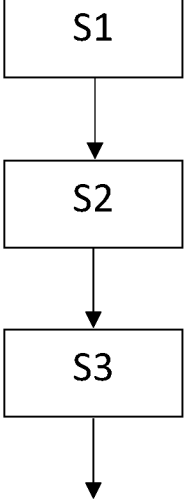
FIG. 2: shows a schematic flow chart of a method according to the invention in a configuration.

FIG. 2 shows a schematic flow chart of a method according to the present disclosure for determining the location of a driver of a vehicle 12 in a configuration. In a first step, ultrasonic signals 18 are transmitted (S1) by at least a first ultrasonic sensor 16 which is arranged on a hand-held device 14. In a second step, the ultrasonic signals are received (S2) by a multiplicity of second ultrasonic sensors 22 arranged on a vehicle 20. In a third step, the received ultrasonic signals are processed, as a result of which the position of the hand-held device 14 with respect to the vehicle 20 is determined.

If the ultrasonic signals transmitted by the first ultrasonic sensor are received by the second ultrasonic sensors which are located on the vehicle, the individual second ultrasonic sensors cannot in principle determine the radial distance from the hand-held device with the time of flight (ToF). The differences in the time of flight can, however, be utilized in order to estimate the location of the hand-held device by means of multilateration. With the aid of the time difference of arrival (TDOA) of the second ultrasonic sensors, hyperbolic curves can however preferably be drawn, the point of intersection of which corresponds to the location of the transmitter, that is to say of the first ultrasonic sensor.

It is possible to create an implementation of a time synchronization between the hand-held device or the first ultrasonic sensor and the vehicle or the second ultrasonic sensors via a radio channel (RF), e.g., Bluetooth or Wi-Fi. If the time synchronization between the hand-held device or the first ultrasonic sensor and the vehicle or second ultrasonic sensors is possible, then it is in principle sufficient to have sufficient ToF measurements from two second ultrasonic sensors. A trilateration is then used in order to determine the location of the hand-held device.

Further, it is in principle also possible to use second ultrasonic sensors which are able to directly estimate the angle of attack (AoA) of ultrasonic signals. If there is no temporal synchronization between the hand-held device and the vehicle, the AoA of at least two second ultrasonic sensors is in principle sufficient in order to determine the location of the hand-held device by means of triangulation. If a temporal synchronization is performed, then an ultrasonic sensor can in principle estimate the radial distance, for example by ToF, and the position, for example by the AoA with respect to the hand-held device.

It is advantageous if the second ultrasonic sensors have two receiver channels. They are configured such that they receive direct and cross-shaped echoes. When receiving direct echoes, the transmitter of the US pulse is preferably the same as the receiver. When receiving cross-shaped echoes, the transmitter of the impulse is a neighbor of the receiver. If the second ultrasonic sensors have two receiver channels, then they can in particular also still detect the surroundings during an operation for pulling into and/or out of a parking space.

The invention has been described above with reference to example embodiments. It is understood that numerous alterations and modifications are possible, without departing from the scope of protection defined by the claims. A combination of the various exemplary embodiments is also possible.

LIST OF REFERENCE NUMERALS

10 Ultrasonic system
12 Driver of a vehicle
14 Hand-held device
16 First ultrasonic sensor
18 Ultrasonic signal
20 Motor vehicle
22 Second ultrasonic sensor
S1-S3 Method steps

The invention claimed is:

1. An ultrasonic system for determining a location of a driver of a vehicle, comprising a hand-held device with at least a first ultrasonic sensor, wherein the first ultrasonic sensor has at least one transmitter, and a motor vehicle having a multiplicity of second ultrasonic sensors, wherein each of the second ultrasonic sensors has at least two receiver channels with a first receiver channel of the at least two receiver channels being configured to receive for processing the signals of the first ultrasonic sensor and a second receiver channel of the at least two receive channels being configured to receive for processing signals other than the signals of the first ultrasonic sensor, wherein the ultrasonic system further comprises a processor associated with the second ultrasonic sensors which processes the received ultrasonic signals, determines the position of the hand-held device relative to the vehicle based upon the processing, and determines a distance between the hand-held device and the vehicle based upon the position of the hand-held device, wherein an operation of the vehicle for at least one of pulling into or out of a parking space is activated based upon the position of the hand-held device relative to the vehicle, and wherein the operation of the vehicle for pulling into or pulling out of the parking space is interrupted before completion of the operation of the vehicle as soon as the determined distance exceeds a predetermined distance.

2. The ultrasonic system according to claim 1, wherein the first ultrasonic sensor is exclusively configured as a sender/transmitter.

3. The ultrasonic system according to claim 1, wherein the first ultrasonic sensor is configured in such a manner that it a transmits a series of ultrasonic bursts after a known time code.

4. The ultrasonic system according to claim 3, wherein the second ultrasonic sensors are configured in such a manner that they receive signals from the first ultrasonic sensor when an operation for at least one of pulling into or pulling out of a parking space is activated.

5. The ultrasonic system according to claim 1, wherein the hand-held device is at least one of a car key, a key fob, a smartphone or a tablet.

6. The ultrasonic system according to claim 1, wherein at least three second ultrasonic sensors are provided and are configured to receive signals from the first ultrasonic sensor.

7. A method for determining the location of a driver of a vehicle, comprising: —transmitting of ultrasonic signals by at least a first ultrasonic sensor which is arranged on a hand-held device, —receiving the ultrasonic signals by a multiplicity of second ultrasonic sensors arranged on a vehicle, —processing the received ultrasonic signals and determining a position of the hand-held device with respect to the vehicle based upon the processing, wherein each of the second ultrasonic sensors has at least two receiver channels with a first receiver channel of the at least two receiver channels being configured to receive for the processing the ultrasonic signals of the first ultrasonic sensor and a second receiver channel of the at least two receive channels being configured to receive for processing ultrasonic signals other than the signals of the first ultrasonic sensor, wherein an operation of the vehicle for at least one of pulling into or out of a parking space is activated based upon the position of the hand-held device, and wherein the operation for at least one of pulling into or pulling out of a parking space is interrupted before completion of the operation of the vehicle as soon as it is established that a specific distance between the hand-held device and the vehicle has been exceeded.

8. The method according to claim 7, wherein the first ultrasonic sensor exclusively transmits ultrasonic signals.

9. The method according to claim 7, wherein the first ultrasonic sensor transmits a series of ultrasonic bursts after a known time code.

10. The method according to the claim 7, wherein the determination of the location of the driver of the vehicle takes place exclusively during the operation for pulling into or out of a parking space.

11. The method according to claim 7, wherein at least one of the first ultrasonic sensor does not transmit ultrasonic signals, the ultrasonic signals are not received by the second ultrasonic sensors, or the ultrasonic signals are not processed until after the operation for at least one of pulling into or pulling out of a parking space has been at least one of activated or recognized.

12. The method according to claim 7, wherein the position of the hand-held device is determined using time difference of arrival (TDOA) multilateration of the ultrasonic signals of the first ultrasonic sensor.

13. The method according to claim 7, wherein the position of the hand-held device is determined using an angle of attack (AoA) determination of the ultrasonic signals of the first ultrasonic sensor.

14. An ultrasonic system for determining a location of a vehicle driver, comprising a hand-held device with at least a first ultrasonic sensor, wherein the first ultrasonic sensor has at least one transmitter, and a plurality of second ultrasonic sensors configured for mounting to a vehicle, wherein each of the second ultrasonic sensors has at least two receiver channels with a first receiver channel of the at least two receiver channels being configured to receive for processing the signals of the first ultrasonic sensor and a second receiver channel of the at least two receive channels being configured to receive for processing signals other than the signals of the first ultrasonic sensor, wherein the ultrasonic system further comprises a processor associated with the second ultrasonic sensors which processes the received ultrasonic signals of the first ultrasonic sensor, determines the position of the hand-held device relative to the vehicle based upon the processing, and determines the distance between the hand-held device and the vehicle based upon the position of the hand-held device, wherein an operation of the vehicle for at least one of pulling into or out of a parking space is activated based upon the position of the hand-held device relative to the vehicle, and wherein the operation of the vehicle for pulling into or pulling out of the parking space is interrupted before completion of the operation of the vehicle as soon as the determined distance exceeds a predetermined distance.

15. The ultrasonic system according to claim 14, wherein the first ultrasonic sensor is exclusively configured as a sender/transmitter.

16. The ultrasonic system according to claim 14, wherein the first ultrasonic sensor is configured in such a manner that it a transmits a series of ultrasonic bursts after a known time code.

17. The ultrasonic system according to claim 16, wherein the second ultrasonic sensors are configured in such a manner that they receive signals from the first ultrasonic sensor when an operation for at least one of pulling into or pulling out of a parking space is activated.

18. The ultrasonic system according to claim 14, wherein the position of the hand-held device is determined using time difference of arrival (TDOA) multilateration of the ultrasonic signals of the first ultrasonic sensor.

19. The method according to claim 7, further comprising determining a distance between the hand-held device and the vehicle based upon the position of the hand-held device relative to the vehicle, wherein the operation of the vehicle for pulling into or pulling out of the parking space is interrupted in response to the determined distance exceeding the specific distance.

\* \* \* \* \*